(12) United States Patent
Ryu (10) Patent No.: US 7,445,080 B2
(45) Date of Patent: Nov. 4, 2008

(54) VARIABLE STEERING RACK SYSTEM

(75) Inventor: Sang Woock Ryu, Goyang (KR)

(73) Assignee: Kia Motors Corporation, Seoul (KR)

( * ) Notice: Subject to any disclaimer, the term of this patent is extended or adjusted under 35 U.S.C. 154(b) by 440 days.

(21) Appl. No.: 11/299,370

(22) Filed: Dec. 8, 2005

(65) Prior Publication Data
US 2006/0175120 A1     Aug. 10, 2006

(30) Foreign Application Priority Data
Jan. 24, 2005     (KR)     ................... 10-2005-0006236

(51) Int. Cl.
*B62D 5/06* (2006.01)
(52) U.S. Cl. ............... 180/428; 180/65.1; 180/197; 180/242; 180/305
(58) Field of Classification Search ............ 180/428, 180/384, 74, 427; 280/70, 79, 444
See application file for complete search history.

(56) References Cited
U.S. PATENT DOCUMENTS

| | | | | |
|---|---|---|---|---|
| 5,083,626 A | * | 1/1992 | Abe et al. ............ | 180/445 |
| 5,165,473 A | * | 11/1992 | Bode .................. | 166/192 |
| 5,927,429 A | * | 7/1999 | Sugino et al. ......... | 180/444 |
| 6,361,280 B1 | * | 3/2002 | Furnas ............... | 416/244 R |
| 6,578,862 B2 | * | 6/2003 | Park et al. ........... | 280/444 |
| 2003/0106738 A1 | * | 6/2003 | Yoneda et al. ........ | 180/446 |
| 2003/0127273 A1 | * | 7/2003 | Fukumoto et al. ..... | 180/400 |
| 2005/0155809 A1 | * | 7/2005 | Krzesicki et al. ..... | 180/407 |
| 2006/0169527 A1 | * | 8/2006 | Lim .................. | 180/444 |

FOREIGN PATENT DOCUMENTS

DE     19963871     1/2001

\* cited by examiner

*Primary Examiner*—Paul N Dickson
*Assistant Examiner*—Tashiana Adams
(74) *Attorney, Agent, or Firm*—Morgan Lewis & Bockius LLP (57) ABSTRACT

A variable steering rack system in one embodiment includes a pair of stop rings and a stopper moveable between the rings. The stopper may be rotatable in one embodiment during translational movement between the rings by a motor. Preferably, the stopper may stop due to a frictional engagement between the stopper and the stop rings. Noise may be reduced, and because the motor may rotate at a high speed, motor performance may not be degraded under low temperature circumstances.

9 Claims, 7 Drawing Sheets

VARIABLE STEERING RACK SYSTEM

CROSS-REFERENCE TO RELATED APPLICATION

This application claims priority to and the benefit of Korean Patent Application No. 10-2005-0006236 filed in the Korean Intellectual Property Office on Jan. 24, 2005, the entire contents of which are incorporated herein by reference.

BACKGROUND OF THE INVENTION (a) Field of the Invention

The present invention relates to a variable steering rack system. More particularly, the present invention relates to a variable steering rack system that has reduced noise when the system is operating.

(b) Description of the Related Art

Figure 1:
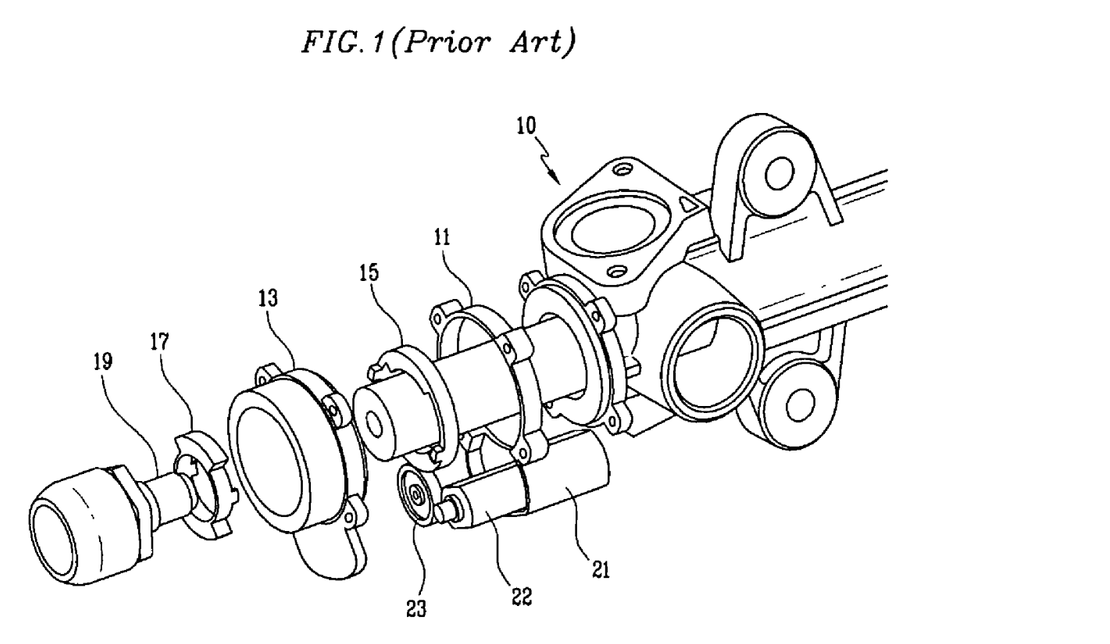
FIG. 1 shows a steering system including a variable steering rack system according to the prior art.
Figure 2:
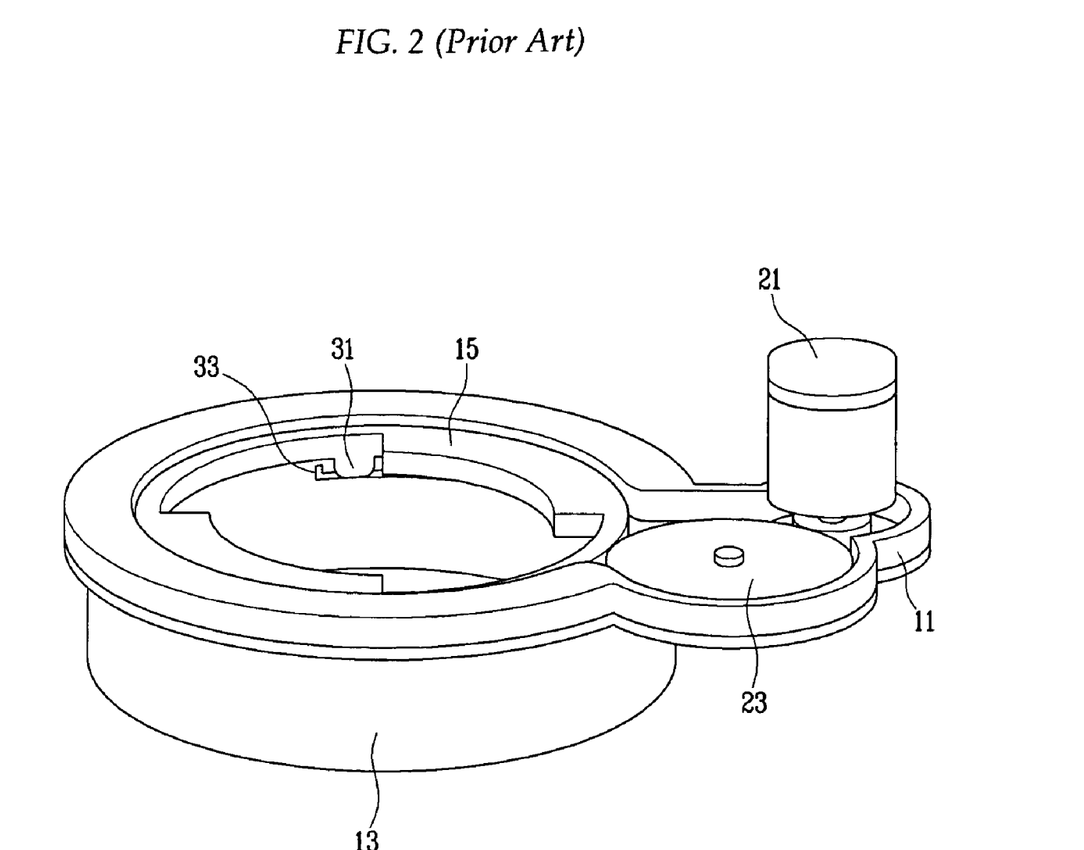
FIG. 2 shows the variable steering rack system according to the prior art.

Generally, a variable steering rack system can regulate a maximum movement displacement of wheels of a vehicle in a case where chains are mounted to tires of the vehicle. FIGS. 1 and 2 shows a steering system including a variable steering rack system according to the prior art. A steering system including a variable steering rack system includes a gear box 10, a steering rack bar 19, a stop knob 17, a case 13, a stopper 15, a motor case 11, a motor 21, a motor gear 22, and an intermediate gear 23. The motor case 11, the stopper 15, and the case 13 are orderly coupled to the gear box 10, and a groove is formed to an interior circumference of the motor case 11. The stopper 15 is disposed to rotate along the groove by the motor 21.

The stop knob 17 is secured to the steering rack bar 19 and in a case that the variable steering rack system is in an initial state, that is, in a case that the variable steering rack system is not operating, the stop knob 17 is formed such that the stop knob 17 is inserted into an interior circumference of the stopper 15. In a case that the variable steering rack system operates, because the stopper 15 rotates corresponding to a movement of the steering rack bar 19, the stop knob 17 is formed such that the stop knob 17 is not inserted into the stopper 15. Therefore, the movement displacement of the steering rack bar 19 is restricted by as much as a thickness of the stopper 15.

The motor 21 transmits a torque to an intermediate gear 23 and the intermediate gear 23 rotates the stopper 15. A stop protrusion 33 is formed in the groove of the interior circumference of the motor case 11 and a knob 31 is formed in the stopper 15. Therefore, as the stopper 15 rotates along the groove in the interior circumference of the case 11, if the stop protrusion 33 contacts to the knob 31 of the stopper 15, the stopper 15 stops rotating. Generally, because the motor 21 utilized in the variable steering rack system rotates at a high speed, a colliding sound is very loud when the stop protrusion 33 contacts with the knob 31 of the stopper 15. In addition, a moving range of the steering rack bar 19 can be controlled or limited by the displacement of the thickness of the stopper 15. In addition, because of the low temperature when the chains are mounted to the tires, in a case that the motor 21 rotates at a low speed in order to prevent the colliding sound, a problem occurs that a performance of the motor 21 is reduced. Furthermore, the layout and shape of the variable steering rack system is complex and complicates the manufacturing process.

SUMMARY OF THE INVENTION

The present invention has been made in an effort to provide a variable steering rack system having advantages of reducing noise and continuously varying a maximum movement displacement. Furthermore, the present invention advantageously provides a variable steering rack system having a simple manufacturing process. An exemplary variable steering rack system according to one possible embodiment of the present invention includes a steering rack bar being moved by power transmitted from a steering gear box and defining a stop protrusion in a predetermined position thereof, a cylindrical case secured to the steering gear box and defining a penetration hole through which the steering rack bar penetrates, a pair of stop rings secured to an interior circumference of the case at a predetermined interval along a moving direction of the steering rack bar, a ring-shaped stopper movably provided in the interior circumference of the case to be movable along the moving direction of the steering rack bar between the pair of stop rings, and selectively contacting with the stop protrusion corresponding to the movement of the steering rack bar such that the ring-shaped stopper can regulate the maximum movement displacement of the steering rack bar corresponding to a position of the ring-shaped stopper, a driving portion moving the stopper, and a control portion controlling the driving portion. A spiral groove is formed on the interior circumference of the case between the stop rings, the driving portion is configured to rotate the stopper, and an exterior surface of the stopper is disposed in the spiral groove such that the stopper can move along the moving direction of the steering rack bar corresponding to the rotation thereof.

DETAILED DESCRIPTION OF THE EMBODIMENT

An embodiment of the present invention will hereinafter be described in detail with reference to the accompanying drawings.

Figure 4:
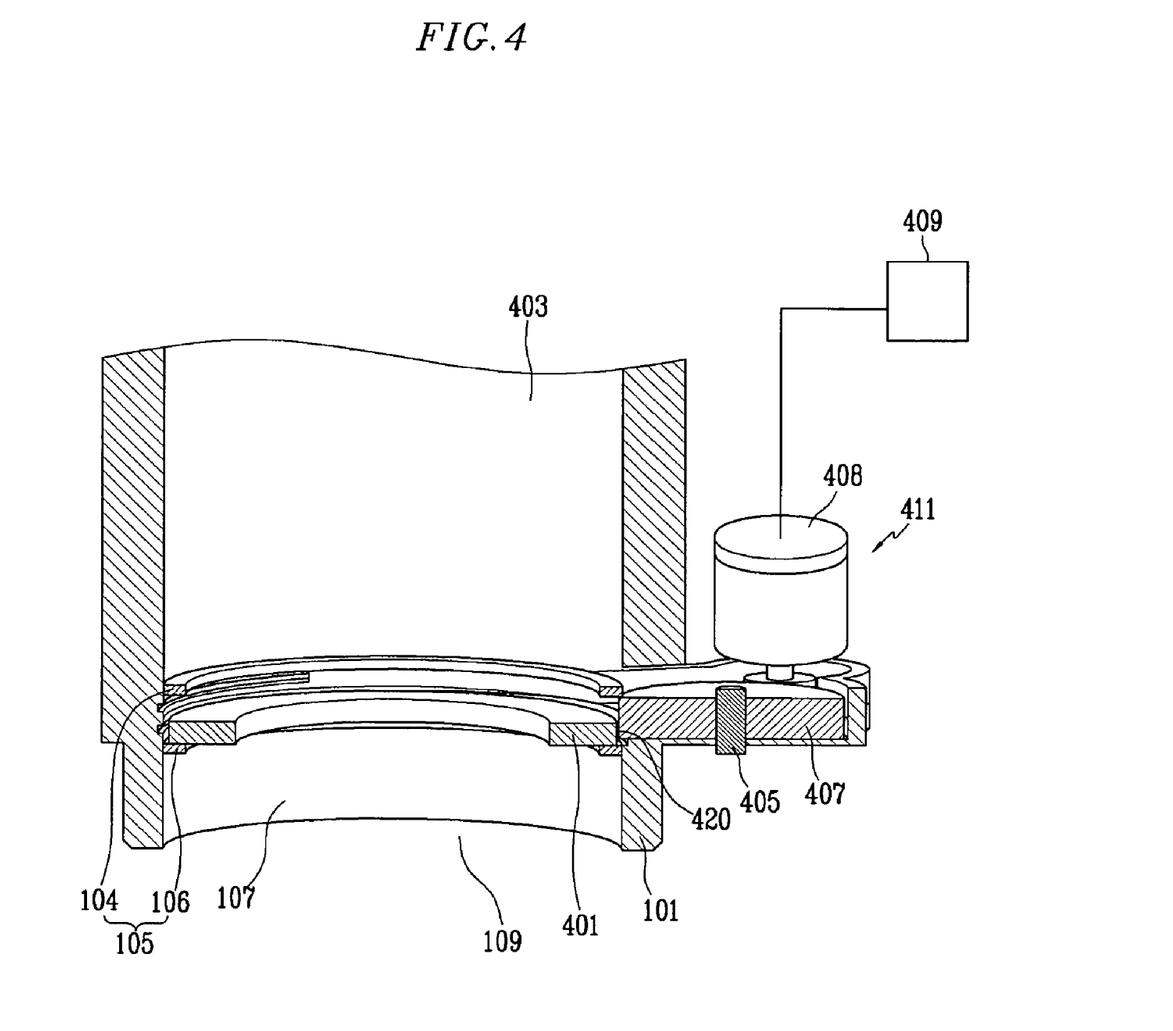
FIG. 4 shows a state where the variable steering rack system operates according to an exemplary embodiment of the present invention.
Figure 5:
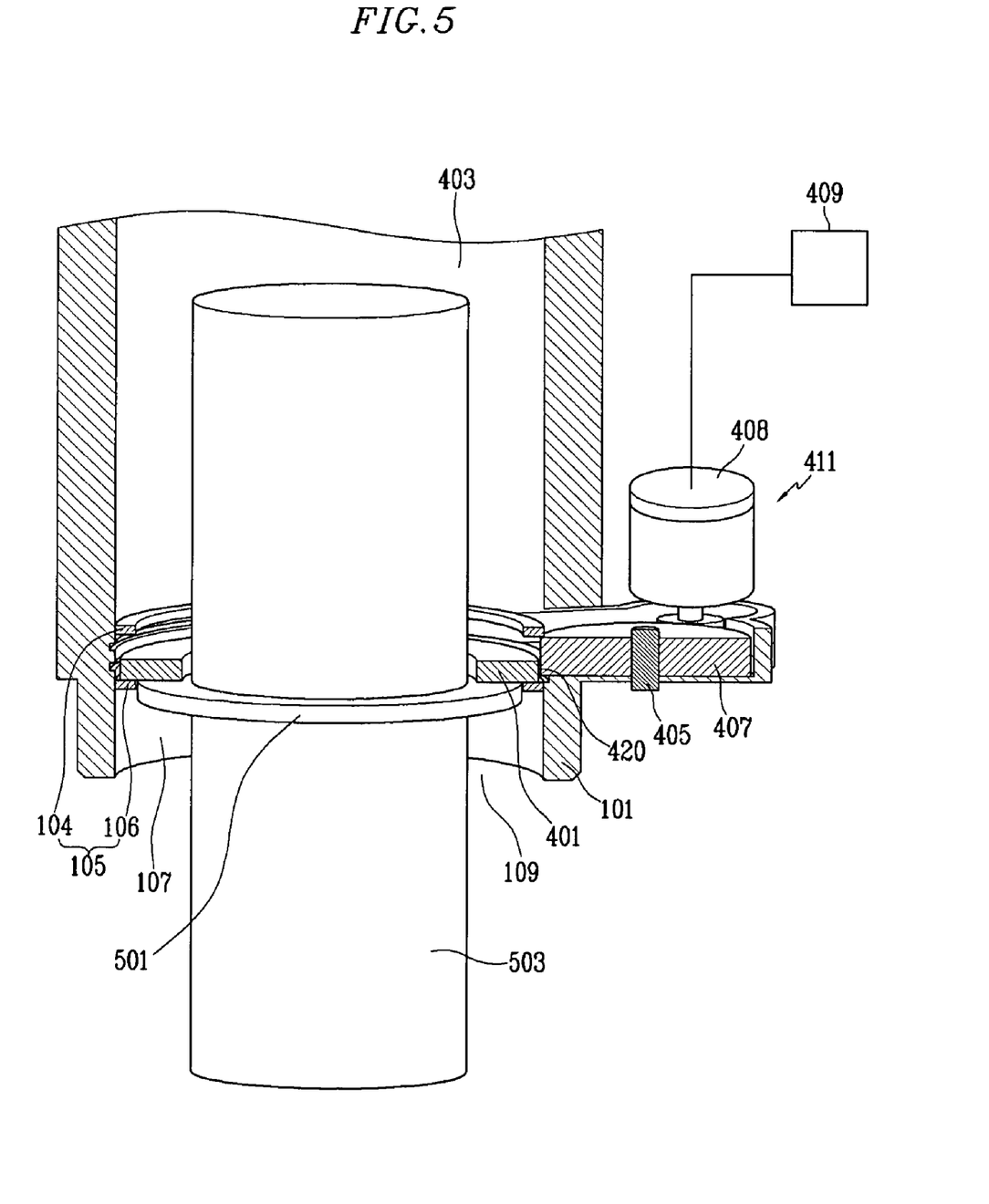
FIG. 5 shows a state that a steering rack bar contacts to a stopper in a state where the variable steering rack system operates according to an exemplary embodiment of the present invention.

As shown in FIG. 4 and FIG. 5, according to an exemplary embodiment of the present invention, the variable steering rack system includes a steering rack bar 503, a cylindrical case 101, a pair of spaced apart stop rings 105, a stopper 401, a driving portion 411, and a control portion 409. The steering rack bar 503 is moved by power transmitted from a steering gear box 403 and defines a stop protrusion 501 in a predetermined position thereof. Steering rack bar 503 further defines a longitudinal axis and a moving direction along the axis. The cylindrical case 101 is secured to the steering gear box 403 and defines a penetration hole 109 through which the steering rack bar 503 penetrates.

Figure 3:
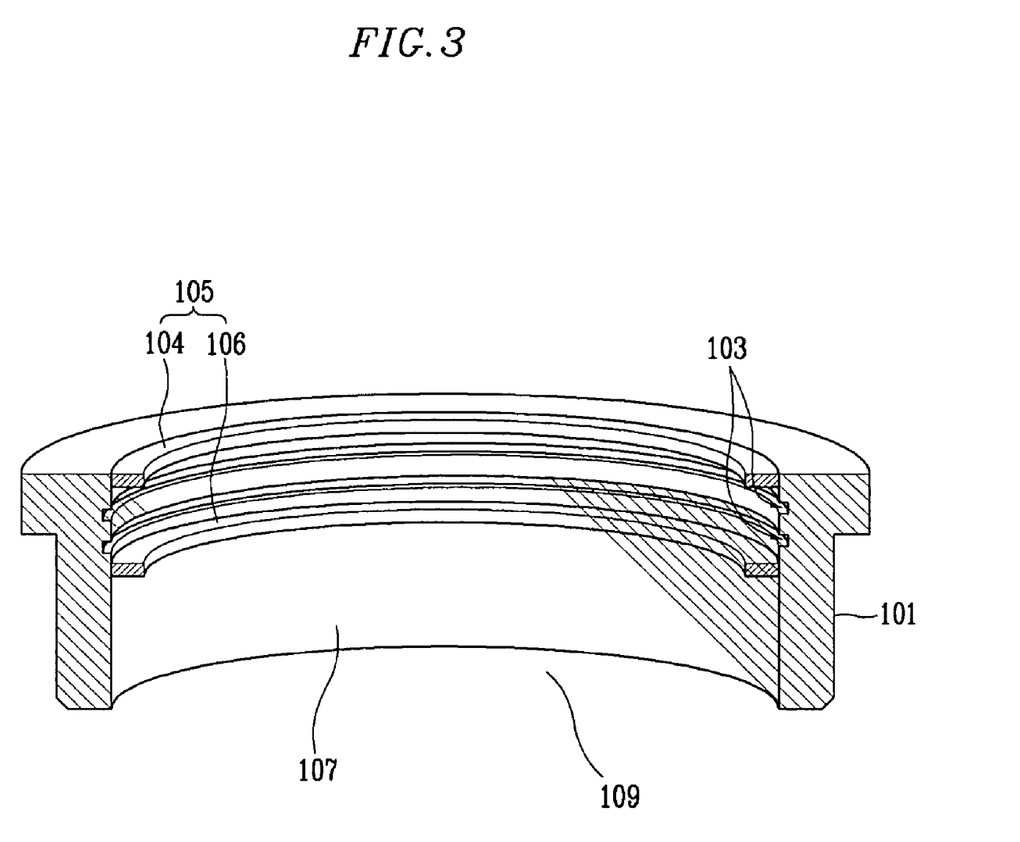
FIG. 3 is a cross sectional view showing a case and a stop ring of a variable steering rack system according to an exemplary embodiment of the present invention.

Referring to FIG. 3 and FIG. 5, the pair of stop rings 105 includes an upper stop ring 104 and a lower stop ring 106 which are secured to an interior circumference 107 of the cylindrical case 101 at a predetermined interval and position along the moving direction of the steering rack bar 503. Positions of the pair of stop rings 105 and the interval or space between the rings may be changed by a person of ordinary skill in the art. The ring-shaped stopper 401 is movably provided in the interior circumference 107 of the cylindrical case 101 to be movable along the moving direction of the steering rack bar 503 between the pair of stop rings 105. Ring-shaped stopper 401 selectively contacts with the stop protrusion 501 corresponding to the longitudinal movement of the steering rack bar 503 such that the ring-shaped stopper 401 can regulate the maximum longitudinal movement or displacement of the steering rack bar 503 corresponding to a position of the ring-shaped stopper 401.

Referring to FIGS. 3-7, a spiral or helical groove 103 is formed to the interior circumference 107 of the cylindrical case 101 between the stop rings 105 and a driving portion 411 is configured to move the stopper 401. An exterior surface 420 of the stopper 401 is slidably disposed in the spiral groove 103 such that the ring-shaped stopper 401 can move along the moving direction of the steering rack bar 503 corresponding to the rotation thereof. The driving portion 411 includes a motor 408, an intermediate gear 407, and an intermediate gear shaft 405 and is secured to the cylindrical case 101.

Power generated from the motor 408 is transmitted to the intermediate gear 407, and the intermediate gear 407 rotates the ring-shaped stopper 401 along the spiral groove 103 by rotating around the intermediate gear shaft 405. In one embodiment, an external surface of the stopper 401 may be configured as a gear. According to one possible exemplary embodiment of the present invention, the motor 408 may be a step motor.

The control portion 409 controls the driving potion 411. More particularly, in one embodiment, the control portion 409 turns the motor 408 on/off. The control portion 409 may include one or more microprocessors operating with a predetermined program including instructions or control logic for controlling the variable steering rack system according to an exemplary embodiment of the present invention as described hereinafter.

According to one exemplary embodiment of the present invention, in a case that chains are mounted to tires of a vehicle, the control portion 409 operates the motor 408 such that the ring-shaped stopper 401 moves and contacts the lower stop ring 106 in a first position. Accordingly, the control portion 409 controls the operation of a motor 408 which is operative to move stopper 401 between the first and second positions, and vice-versa. In a case where the chains are removed from the tires, the control portion 409 operates the motor 408 such that the ring-shaped stopper 401 moves and contacts the upper stop ring 104 in a second position.

Figure 6:
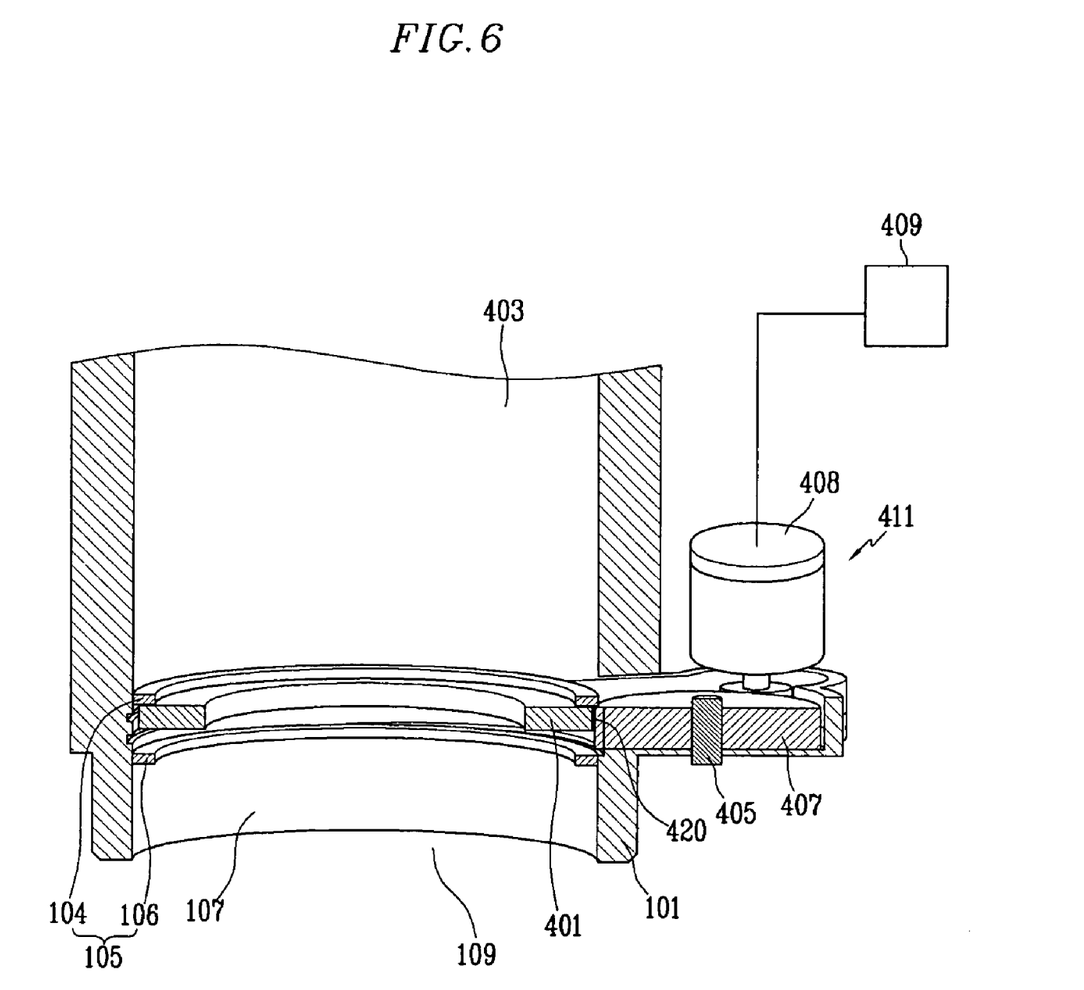
FIG. 6 shows an initial state of the variable steering rack system according to an exemplary embodiment of the present invention.
Figure 7:
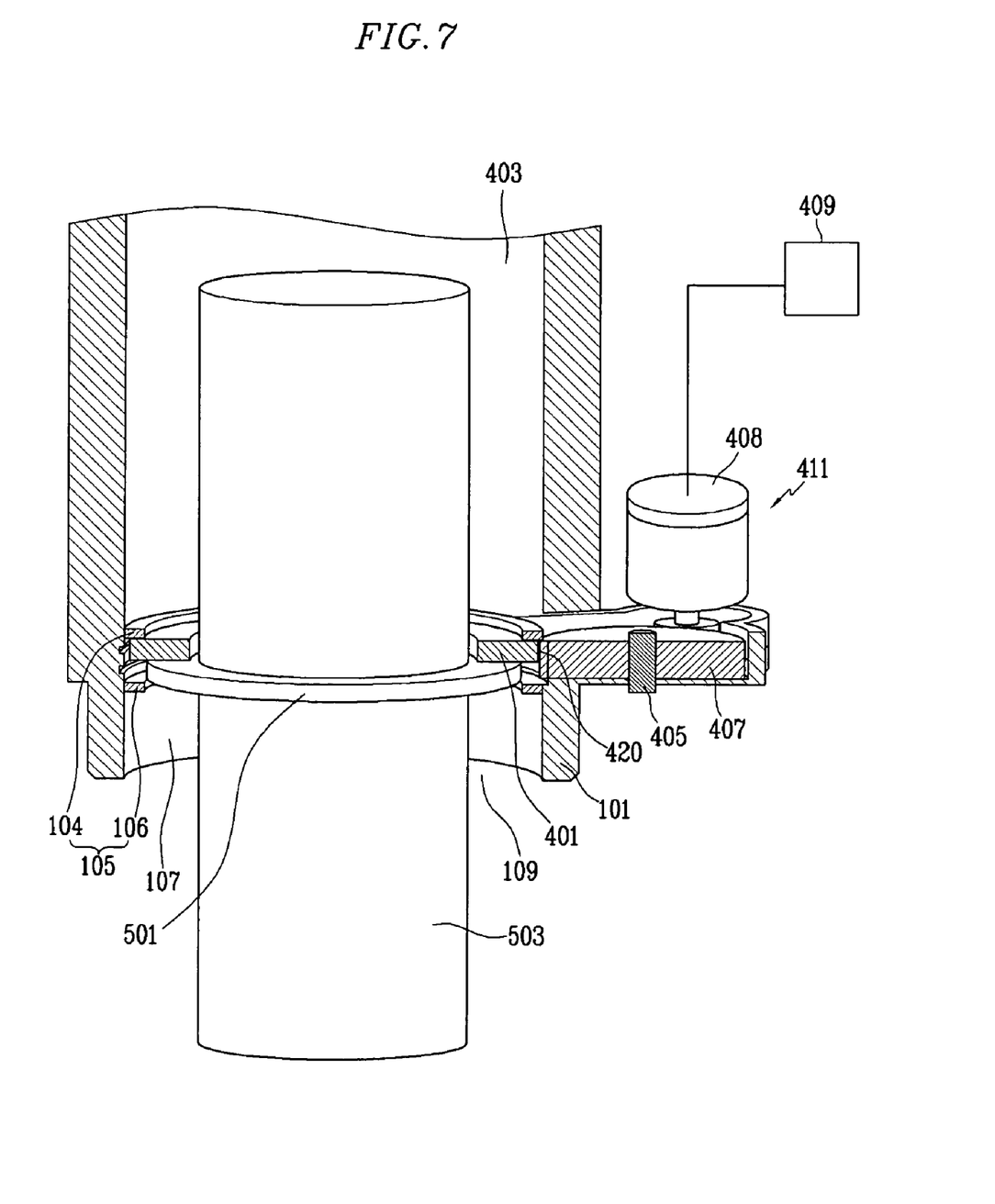
FIG. 7 shows a state where the steering rack bar is contacted to a stopper in an initial state of the variable steering rack system according to an exemplary embodiment of the present invention.

As shown in FIG. 6 and FIG. 7, according to an exemplary embodiment of the present invention, in an initial state where the variable steering rack system is not operating, the steering rack bar 503 may be moved to the position shown where the ring-shaped stopper 401 is located against upper stop ring 104 by power transmitted from the steering gear box 403. Because the ring-shaped stopper 401 is contacted to the upper stop ring 104 whilst moving along the spiral groove 103, the ring-shaped 401 stops gradually due to friction between a surface of lower and the upper stop ring 104 against an upper surface of the ring-shaped stopper 401. Advantageously, because the ring-shaped stopper 401 is stopped by friction instead of abruptly abutting surface contact like in known variable steering rack systems, a loud banging noise may not occur. In addition, the frictionally-engaging surfaces are less prone to fatigue failure as in known systems.

On the other hand, in the case where the chains are mounted to the tires of the vehicle, as shown in FIG. 4 and FIG. 5, the ring-shaped stopper 401 is gradually and frictionally stopped by the lower stop ring 106 by which the control portion 409 operates the driving portion 411. Therefore, a maximum movement displacement of the steering rack bar 503 is reduced or limited by the amount that the stop protrusion 501, formed or attached to the steering rack bar 503, is contacted to the stopped ring-shaped stopper 401 by the lower stop ring 106. Because stopper 401 stops due to friction between a lower surface of stopper 401 and an upper surface of lower stop ring 106, a loud banging sound and high impact stresses are advantageously avoided in a manner similar to that described above.

In the case where the chains are then removed from the tires of the vehicle, the ring-shaped stopper 401 moves back to the initial position as shown in FIG. 6 and FIG. 7 by which the control portion 409 operates the driving portion 411 such that the ring-shaped stopper 401 is gradually stopped by the upper stop ring 104. According to an exemplary embodiment of the variable steering rack system of the present invention described above, therefore, the maximum movement displacement of the steering rack bar 503 can be variably regulated. Moreover, the maximum longitudinal movement displacement of the steering rack bar 503 increases by the amount that the stop protrusion 501 is contacted to the ring-shaped stopper 401 by the lower stop ring 106. Furthermore, according to an exemplary embodiment of the present invention, because the motor 408 of the variable steering system rotates at a high speed, performance of the motor 408 cannot be degraded under low temperature circumstances.

According to the exemplary embodiment of the present invention, because the stopper is stopped by a frictional force with the stop ring, even though the stopper rotates at a high speed since the motor rotates at a high speed, noise is minimized during the stopper stopping. Therefore, the performance of the motor is maintained by rotating at the high speed and simultaneously a minimization of the noise can be realized. Furthermore, because positions of the stop rings of the variable steering rack system may be changed, the maximum longitudinal movement displacement of the steering rack bar can be continuously varied, and because of a simple scheme thereof, the manufacturing process of the variable steering rack system can be simplified.

While this invention has been described in connection with an exemplary embodiment, for convenience it is to be understood that the invention is not limited to the disclosed embodiment, but, on the contrary, is intended to cover various modifications and equivalent arrangements included within the spirit and scope of the appended claims.

What is claimed is:

1. A variable steering rack system comprising:
a steering rack bar being driven from a steering gear box and defining a stop protrusion in a predetermined position thereon;

a cylindrical case supported by the steering gear box and defining a penetration hole through which the steering rack bar penetrates;

a pair of spaced-apart stop rings secured to an interior circumference of the case at a predetermined interval along a longitudinal moving direction of the steering rack bar;

a spiral groove formed on the interior circumference of the case between the stop rings;

a stopper movably disposed in the interior circumference of the case to be movable along the moving direction of the steering rack bar between the pair of stop rings, an exterior surface of the stopper being slidably disposed within the spiral groove such that the stopper can move along the moving direction of the steering rack bar by rotating the stopper;

wherein the stop protrusion selectively contacts the stopper corresponding to the movement of the steering rack bar in the moving direction to regulate the movement displacement of the steering rack bar.

2. The system of claim 1, further comprising a driving portion coupled to the stopper that imparts rotational movement to the stopper to move the stopper between the stop rings.

3. The system of claim 2, wherein the driving portion is a motor.

4. The system of claim 2, further comprising a control portion that controls operation of the driving portion.

5. The system of claim 2, further comprising a gear coupled between the driving portion and the stopper that imparts the rotational movement to the stopper.

6. The system of claim 1, wherein the stopper is configured to frictionally engage the pair of stop rings, thereby stopping movement of the stopper in the moving direction.

7. The system of claim 1, wherein the stopper is movable from a first position engaging one of the stop rings to a second position engaging the other stop ring.

8. The system of claim 1, wherein the stop protrusion is configured as a flange.

9. The system of claim 1, wherein the stopper is ring-shaped and the steering rack bar is inserted through the stopper.

* * * * *